US008914043B2

(12) United States Patent
Zelinka (10) Patent No.: US 8,914,043 B2
(45) Date of Patent: Dec. 16, 2014

(54) CREATING AND SHARING PRIVATE LOCATION DATABASES

(75) Inventor: Stephen D. Zelinka, Los Gatos, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/450,049

(22) Filed: Apr. 18, 2012

(65) Prior Publication Data

US 2013/0281122 A1 Oct. 24, 2013

(51) Int. Cl.
*H04W 24/00* (2009.01)

(52) U.S. Cl.
USPC .................. 455/456.3; 455/404.2; 455/456.1; 455/456.2; 455/456.4; 455/456.6

(58) Field of Classification Search
CPC ... H04W 64/00; H04W 48/04; H04W 64/003; H04W 4/206; H04W 12/08; G01S 5/0278; G01S 19/42; G01S 13/82; G01S 13/878; H04L 67/18; G06Q 30/0259; G06Q 30/0261; H04B 7/18545
USPC ........................................... 455/456.1–456.6
See application file for complete search history.

(56) References Cited

U.S. PATENT DOCUMENTS

| 6,618,005 | B2 | 9/2003 | Hannah et al. |
| 7,353,034 | B2 * | 4/2008 | Haney ............................ 455/457 |
| 8,320,939 | B1 * | 11/2012 | Vincent ...................... 455/456.1 |
| 2006/0019679 | A1 * | 1/2006 | Rappaport et al. ......... 455/456.5 |
| 2008/0036653 | A1 | 2/2008 | Huston |
| 2008/0161011 | A1 | 7/2008 | Babin et al. |
| 2008/0172361 | A1 * | 7/2008 | Wong et al. ........................ 707/3 |
| 2009/0085806 | A1 | 4/2009 | Piersol et al. |
| 2009/0088182 | A1 | 4/2009 | Piersol et al. |
| 2009/0088183 | A1 | 4/2009 | Piersol et al. |
| 2009/0325603 | A1 | 12/2009 | Van Os et al. |

(Continued)

FOREIGN PATENT DOCUMENTS

| EP | 2 192 811 | | 6/2010 |
| EP | 2 386 878 | A1 | 11/2011 |
| WO | WO-2006/014439 | | 2/2006 |

OTHER PUBLICATIONS rc3.org Rafe Colburn on Software Development (and other topics) "How Apple Uses Crowd-Sourcing to Find Your Location", 2011. Retrieved from the Internet on Apr. 18, 2012: http://rc3.org/2011/04/27/how-apple-uses-crowd-sourcing-to-find-your-location/.

(Continued)

*Primary Examiner* — Charles Appiah
*Assistant Examiner* — Edward Zhang
(74) *Attorney, Agent, or Firm* — Marshall, Gerstein & Borun LLP (57) ABSTRACT

A mobile device receives signals from transmitting devices and generates sets of signal metrics based on the received signals. The mobile device also receives indicated locations, where each indicated location is associated with a respective set of signal metrics. The mobile device provides location-specific data to a transmitting device locating engine to estimate locations of the transmitting devices, where the location-specific data includes data representing the sets of signal metrics and data representing the indicated locations. The mobile device further receives an indication of sharing criteria via a user interface of the mobile device, and causes the estimated locations to be selectively shared with one or more other mobile devices based on the sharing criteria.

9 Claims, 4 Drawing Sheets

(56) References Cited

U.S. PATENT DOCUMENTS

| | | | |
|---|---|---|---|
| 2010/0015999 A1 | 1/2010 | Belz et al. | |
| 2010/0309051 A1 | 12/2010 | Moshfeghi | |
| 2011/0143776 A1 | 6/2011 | Shankaranarayanan et al. | |
| 2011/0207469 A1 | 8/2011 | Hinds et al. | |
| 2012/0008526 A1 | 1/2012 | Borghei | |

OTHER PUBLICATIONS

Apple Press Info "Apple Q&A on Location Data", 2011. Retrieved from the Internet on Apr. 18, 2012: http://www.apple.com/pr/library/2011/04/27Apple-Q-A-on-Location-Data.html.

MobileMarketing Watch "Google Using Mobile Apps to Crowdsource a Massive Database of WiFi Hot Spots", 2010. Retrieved from the Internet on Apr. 18, 2012: http://www.mobilemarketingwatch.com/google-using-mobile-apps-to-crowdsource-a-massive-database-of-wifi-hot-spots-7659/.

GPS for Today "GPS Tracking for the Rest of Us". Cell Phone GPS Tracking, 2009. Retrieved from the Internet on Apr. 18, 2012: http://www.gpsfortoday.com/cell-phone-gps-tracking/.

Ekahau—A Free Mapping Wireless Surveying Tool (Video). Retrieved from the Internet on Apr. 18, 2012: http://www.youtube.com/watch?v=h2J64eVq-gw&feature=related.

Free Wireless Site Survey Software for Mac OS X (Video). Retrieved from the Internet on Apr. 18, 2012: http://www.youtube.com/watch?v=dU3Ge-GOC4M.

Meraki—"WiFi Mapper", 2012. Retrieved from the Internet on Apr. 18, 2012: http://www.meraki.com/products/wireless/wifi-mapper#faq:what_is_wifi_mapper.

International Search Report and Written Opinion for Application No. PCT/US2013/035711, dated Jul. 26, 2013.

\* cited by examiner

CREATING AND SHARING PRIVATE LOCATION DATABASES

FIELD OF THE DISCLOSURE

The present disclosure relates generally to locating mobile devices, and more specifically to locating mobile devices using known locations of observed transmitting devices.

BACKGROUND

The background description provided herein is for the purpose of generally presenting the context of the disclosure. Work of the presently named inventors, to the extent that work is described in this background section, as well as aspects of the description that may not otherwise qualify as prior art at the time of filing, are neither expressly nor impliedly admitted as prior art against the present disclosure.

Today, many mobile devices (smartphones, tablet personal computers, etc.) are capable of determining their locations using one or more of various locating techniques. For example, some mobile devices are equipped with a Global Positioning System (GPS) chip to determine the latitude, longitude, and elevation of the mobile device based on signals received from several GPS satellites. Some mobile devices are instead (or additionally) capable of determining location using signals from fixed or semi-fixed terrestrial elements having known locations, such as cellular infrastructure elements (e.g., cell towers), WiFi access points (APs) or "hotspots," etc. These locating techniques based on fixed or semi-fixed terrestrial elements may be especially useful if other techniques such as GPS are unavailable. For example, signals from WiFi APs and/or cell towers may be used to locate a mobile device when the mobile device is indoors and unable to receive a GPS signal, or does not include a GPS chip. Typically, the mobile device receives a signal from a WiFi AP or cell tower, and requests a location of the observed AP or cell tower from a location provider such as Google, Apple, or Skyhook. Requests are typically sent to the location provider because the set of locations of all possible transmitters would be too large for typical mobile devices, and due to constant change would be difficult to keep up-to-date.

Relying on fixed or semi-fixed terrestrial elements such as cell towers or WiFi APs to locate a mobile device suffers from various drawbacks. For example, cell towers may be sparsely located in certain areas, making accurate positioning difficult. Cell towers may also be relocated several or more times a year (e.g., identifiers of cell towers in a particular region may be remapped), which can cause a location provider to report incorrect locations until the cell tower locations in a database are updated. While WiFi APs may be more densely located than cell towers, APs may, in some instances, be relocated even more often than cell towers. For APs that move frequently (e.g., APs used during conferences or other temporary events), maintaining a fresh location database may be particularly difficult. Moreover, for privacy reasons, some AP owners prevent their APs from being used to locate mobile devices.

SUMMARY

In an example implementation, a method in a mobile device includes receiving one or more sets of signals from one or more transmitting devices via a network interface of the mobile device, generating one or more sets of signal metrics based on the received one or more sets of signals, and receiving one or more indicated locations, where each indicated location is associated with a respective one of the one or more sets of signal metrics. The method also includes providing location-specific data to a transmitting device locating engine to determine estimated locations of the one or more transmitting devices, where the location-specific data includes data representing the one or more sets of signal metrics and data representing the one or more indicated locations, receiving an indication of one or more sharing criteria via a user interface of the mobile device, and causing the estimated locations to be selectively shared with one or more other mobile devices based on the one or more sharing criteria. In various embodiments, receiving the indication of the one or more sharing criteria includes receiving an indication of one or more members of a social network, and/or receiving an indication of one or more members of an organization.

According to another example implementation, a system creating and sharing a private location database includes a first mobile device associated with a first user, a computer-readable medium storing a data record including a service configuration specific to the first user, and a second mobile device associated with the second user. The first mobile device is configured to collect location-specific data corresponding to one or more transmitting devices and cause a private location database to be generated based on the collected location-specific data. In various embodiments, the location-specific data includes manually entered indications of locations of the one or more transmitting devices, manually entered indications of locations of the first mobile device, and/or signal metrics corresponding to wireless signals received from the one or more transmitting devices. The data record includes service configuration specific to the first user, such that the service configuration associates the private location database with either the second user or a second group of which the second user is a member. The second mobile device is configured to cause a location of the second mobile device to be determined utilizing the private location database, where the private location database is utilized in response to the association in the service configuration of the private location database with the second user or the second group.

In another example implementation, a method in a mobile device includes obtaining a private location database indicator that corresponds to a private location database storing transmitting device locations, receiving one or more signals from one or more transmitting devices, where the one or more signals include one or more identifiers corresponding to the one or more transmitting devices, generating one or more signal metrics based on the one or more received signals, gaining access to the private location database using the private location database indicator, and determining a location of the mobile device using location information stored in the private location database and the generated one or more signal metrics. In an embodiment, the private location database indicator is obtained by reading a QR code, a bar code, or a code manually entered by a user. Moreover, in an embodiment, access to the private location database is gained by transmitting the private location database indicator to a server of a location provider system.

In another example implementation, instructions for accessing location information corresponding to a plurality of transmitting devices are stored on a tangible non-transitory computer-readable medium. The instructions, when executed by one or more processors of a location provider system, cause the one or more processors to receive a plurality of identifiers from a mobile device, where each identifier corresponds to a respective one of the plurality of transmitting devices, and where the plurality of identifiers includes at least a first identifier and a second identifier. The instructions further cause the one or more processors to retrieve a first estimated location from a master location database, where the first estimated location corresponds to the first identifier. Further, the instructions cause the one or more processors to determine whether location information stored in a private location database may be shared with the mobile device and, in response to a determination that the location information stored in the private location database may be shared with the mobile device, cause a second estimated location to be retrieved from the private location database, where the second estimated location corresponds to the second identifier. In various embodiments, determining whether the one or more sharing criteria are satisfied includes determining whether a user of the mobile device is associated with a particular social network, whether a user of the mobile device is associated with a particular organization, whether the mobile device is associated with a particular identifier, and/or whether the mobile device is associated with a particular code. Still further, the instructions cause a location of the mobile device to be determined based on at least the first estimated location and the second estimated location.

DETAILED DESCRIPTION

In embodiments described below, a private location database storing locations of WiFi access points (APs) and/or other transmitting devices may be created and selectively shared with mobile device users. A mobile device user with access to the private location database may use locations stored in the database to augment a master location database of a location provider, which may include stale and/or incomplete location data. Access to the private location database can be limited in various ways, such as being restricted to mobile device users who are members of a particular organization or social network indicated by an owner of the private location database, or being restricted to mobile device users who have scanned in a particular code, etc.

Figure 1:
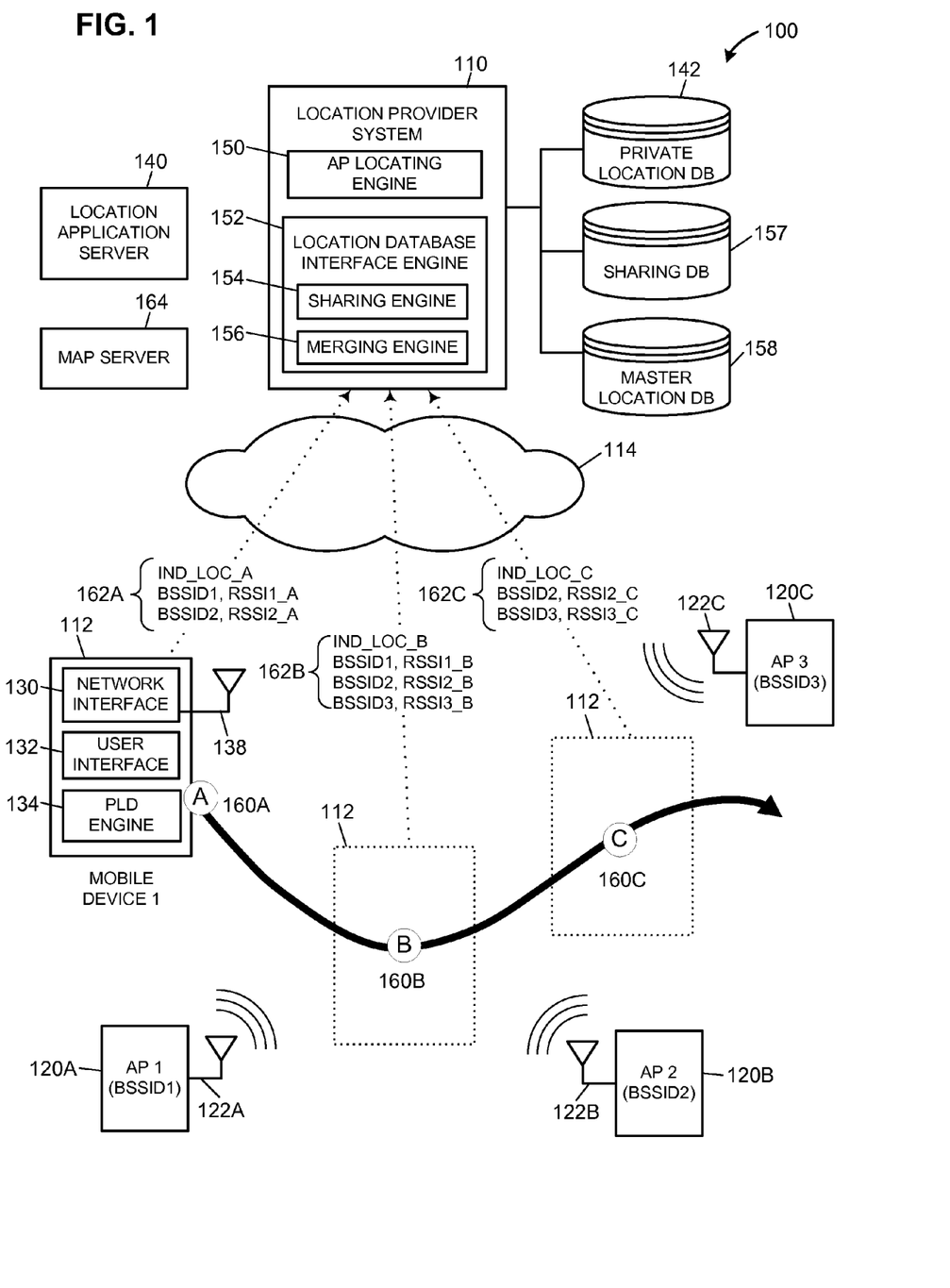
FIG. 1 is a block diagram of an example system in which example techniques for creating or updating a private location database are applied.

FIG. 1 is a block diagram of an example system 100 in which example techniques for creating or updating a private location database are applied. The system 100 includes a location provider system 110 in communication with a mobile device 112 via a communication network 114. Location provider system 110 includes one or more computing devices (e.g., servers), and may reside at a single location or be distributed across multiple locations. Mobile device 112 may be a smartphone or tablet personal computer, for example. Communication network 114 includes one or more sub-networks, including at least one wireless network. For example, communication network 114 may include both a cellular network (e.g., including cell towers, etc.) and a wired or wireless Ethernet local area network (e.g., including routers, bridges, etc.).

In the general vicinity of mobile device 112 are three APs 120 (e.g., WiFi APs). A first AP 120A is associated with a first basic service set identifier (BSSID1), a second AP 120B is associated with a second basic service set identifier (BSSID2), and a third AP 120C is associated with a third basic service set identifier (BSSID3). Each BSSID is a MAC address associated with the corresponding AP of APs 120. The APs 120 may be distributed throughout a particular building or geographic area (e.g., a conference center, a campus, etc.). Each AP 120 includes at least one antenna 122 for transmitting signals. For some or all of the APs 120, the antenna 122 may also be used for receiving signals. While FIG. 1 shows three APs 120, other embodiments or scenarios may include more or fewer than three APs 120.

Mobile device 112 includes a network interface 130, a user interface 132, a private location database (PLD) engine 134, and at least one antenna 138. In an embodiment, mobile device 112 is configured to operate in at least two different wireless communication networks using at least two different communication protocols. A first communication protocol is used for communications over a first communication network, and a second communication protocol is used for communications over a second communication network. In the embodiment shown in FIG. 1, for example, the first communication network may be a cellular network included in communication network 114, and the second communication network may be a shorter range network (e.g., a WiFi network) that includes mobile device 112 and APs 120 but not communication network 114. Antenna 138 of mobile device 112 is used for communications in the second (e.g., WiFi) communication network. In some embodiments, antenna 138 is also used for communications in the first (e.g., cellular) communication network. In other embodiments, one or more other antennas (not shown) are used for communications in the first communication network. In some embodiments, mobile device 112 is additionally configured to utilize one or more locating services (e.g., GPS) that do not make use of the locating techniques described herein.

The network interface 130 of mobile device 112 includes hardware and/or software configured to receive (via antenna 138) signals transmitted by APs 120 (via antennas 122) according to the second (e.g., WiFi) protocol, and to pass the received signal (or data derived from the received signal) to other portions of mobile device 112 (e.g., to various engines within mobile device 112). In some embodiments, the network interface 130 is also configured to transmit signals via antenna 138 (e.g., for reception by any of APs 120). The network interface 130 may also be configured to transmit and receive signals via the first (e.g., cellular) communication network. Alternatively, mobile device 112 may include another network interface (not shown in FIG. 1) separate from network interface 130 that is configured to transmit and receive signals via the first communication network.

The user interface 132 of mobile device 112 includes hardware and/or software configured to receive manual inputs from, and provide perceptible outputs to, a user of mobile device 112. For example, the user interface 132 may cause a graphical user interface (GUI) display to be presented to a user (e.g., via a touchscreen display of mobile device 112), and/or receive data indicating keyboard and/or touchscreen inputs manually entered by a user.

The private location database engine 134 includes software instructions that are stored on a computer-readable medium and are configured to be executed by one or more processors in mobile device 112. In the embodiment shown in FIG. 1, the private location database engine 134 is an application, plugin, script, or other software component that is downloaded from or accessed via a location application server 140. Mobile device 112 may access the location application server 140 directly or through the location provider system 110, for example. Alternatively, private location database engine 134 may include software instructions of a software component that is installed in mobile device 112 before mobile device 112 is purchased by a user. In various other embodiments, the private location database engine 134 includes hardware, firmware, or a combination of software, hardware, and/or firmware. In an alternative embodiment, the location application server 140 is a part of location provider system 110. The private location database engine 134 is generally configured to collect information for creating and/or updating a private location database 142 which, in the embodiment shown in FIG. 1, is coupled to location provider system 110. Creating or updating the private location database 142 using the private location database engine 134 is described in more detail below with reference to FIG. 1. Once created, the private location database 142 may be used by one or mobile devices attempting to self-locate (e.g., by a mobile device of the owner of the private location database 142, and/or by mobile devices of users with which the private location database 142 has been shared), as described in more detail below with reference to FIG. 3. In some embodiments, the mobile device 112 can itself make use of the private location database 142 for self-locating once the database 142 is created.

Location provider system 110 includes an AP locating engine 150 and a location database interface engine 152. The location database interface engine 152 includes a sharing engine 154 and a merging engine 156, which are discussed below with reference to FIG. 3. Location provider system 110 is coupled to the private location database 142, a sharing database 157, and a master location database 158. The private location database 142 and the master location database 158 each store identifying information (e.g., BSSIDs) and location information (e.g., estimated locations) corresponding to various transmitting devices (e.g., APs and/or cell towers). Whereas the master location database 158 is generally available to all mobile devices served by location provider system 110, access to the private location database 142 is restricted. For example, locations in the private location database 142 may be available to a select group of one or more owner entities (and/or one or more mobile devices) associated with the private location database 142, while locations in the master location database 158 may be generally available to any entity and/or mobile device that uses the locating services of a location provider (e.g., a location provider associated with location provider system 110). As another example, locations in the private location database 142 may be available to any mobile device associated with a particular identifier (or with any identifier of a particular group of identifiers), but unavailable to other mobile devices not associated with the identifier(s) (or, alternatively, unavailable to the other mobile devices unless one or more sharing criteria are satisfied, as described in further detail below). In some embodiments and/or scenarios, location provider system 110 is coupled to more than one private location database similar to private location database 142, with each private location database being associated with a different owner or group of owners (and/or different mobile devices).

In some embodiments, the private location database 142 stores data that does not directly represent transmitting device (e.g., AP) locations, but may nonetheless be used for locating a mobile device. For example, the private location database 142 may be used within systems that locate mobile devices based on transmitting device "fingerprints." In some such systems, for example, mobile devices consider a combination of received transmitting device identifiers (e.g., BSSIDs of APs) and signal strengths jointly as a fingerprint of the current location of the mobile device. In such embodiments, the private location database 142 may store content other than transmitting device locations.

While the private location database 142 of example system 100 is coupled to location provider system 110, in various other embodiments the private location database 142 is instead included within location provider system 110, within mobile device 112, or within a third party server remote from both location provider system 110 and mobile device 112. Moreover, while the master location database 158 of example system 100 is coupled to location provider system 110, the master location database 158 is instead included within location provider system 110 in an alternative embodiment.

The sharing database 157 stores permissions data corresponding to private location database 142. The sharing database 157 may be a part of private location database 142, for example, and/or included in location provider system 110. The sharing database 157 is discussed further below with reference to FIG. 3.

The AP locating engine 150 includes software instructions that are stored on a computer-readable medium and are configured to be executed by one or more processors in location provider system 110. In various other embodiments, the AP locating engine 150 includes hardware, firmware, or a combination of software, hardware, and/or firmware. The AP locating engine 150 is generally configured to receive information relating to one or more APs, and to estimate locations of the APs based on the received information. The AP locating engine 150 then causes the estimated locations to be stored in a location database, such as private location database 142 or master location database 158. The AP locating engine 150 may also be configured to locate transmitting devices other than APs (e.g., cell towers), and/or areas associated with other transmitting devices (e.g., serving areas of cell towers). Moreover, while the engine 150 of FIG. 1 (and FIG. 3, discussed below) is an "AP locating engine," in other embodiments the engine 150 only locates non-AP transmitting devices (and/or areas associated with non-AP transmitting devices, etc.).

While AP locating engine 150 is included in location provider system 110 in the example system 100, AP locating engines are included in both location provider system 110 and mobile device 112 in an alternative embodiment. For example, mobile device 112 may include its own AP locating engine (similar to AP locating engine 150), where the AP locating engine is configured to estimate the AP locations that are to be stored in the private location database 142. In some embodiments, the mobile device 112 may also include hardware and software configured to determine a relative location of the device 112 at different times when AP signals are received. For example, the mobile device 112 may observe how a signal from an AP changes as the mobile device 112 is moved around by a user by any suitable means for tracking local movement such as inertial sensors and/or other sensors (e.g., a gyroscope, a compass, a barometer, an accelerometer, a camera with video processing to detect movement, a speaker and microphone with audio processing to detect movement, etc.). In this manner, data may be collected to build the private location database 142 without requiring a user to manually input any locations. Alternatively, a user may input a single location on a map to provide coordinates to which all tracked local movements may be referenced.

Figure 3:
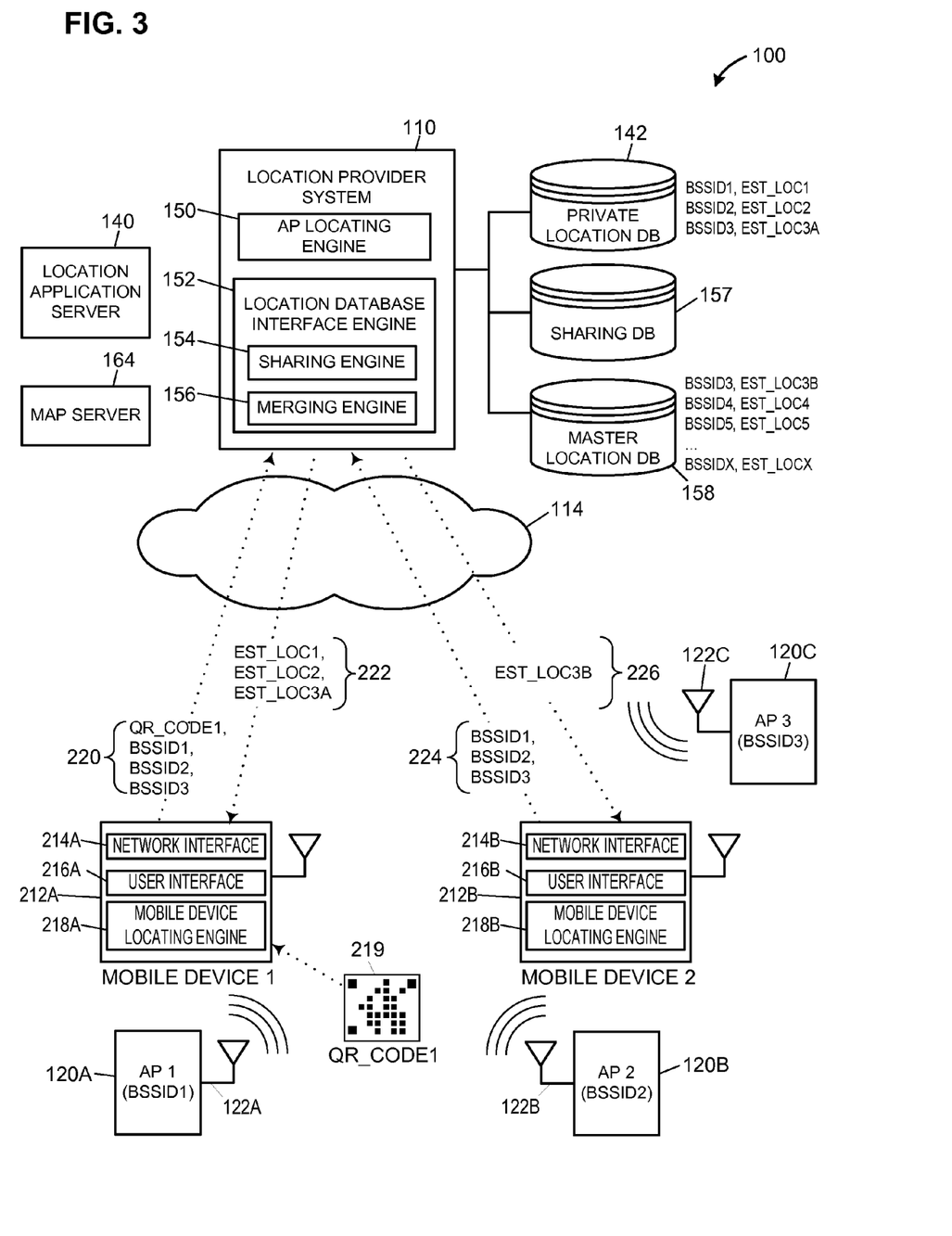
FIG. 3 is a block diagram of the example system of FIG. 1 for an example scenario in which example techniques for utilizing a private location database are applied.

The location database interface engine 152 includes software instructions that are stored on a computer-readable medium and are configured to be executed by one or more processors in location provider system 110. In various other embodiments, the location database interface engine 152 includes hardware, firmware, or a combination of software, hardware, and/or firmware. The location database interface engine 152 is generally configured to receive identifying information corresponding to transmitting devices (e.g., BSSIDs of APs 120), and to utilize the received identifying information to retrieve estimated locations of the transmitting devices from a location database (e.g., master location database 158 and/or private location database 142). A sharing engine 154 within location database interface engine 152 determines whether a mobile device from which a location query is received is permitted to utilize the private location database 142. For example, and as described in further detail below, the sharing engine 154 may determine whether one or more sharing criteria for accessing the private location database 142 are satisfied (e.g., whether a querying mobile device is included in a permissions list stored in sharing database 157). A merging engine 156 within location database interface engine 152 aggregates estimated locations retrieved from private location database 142 and estimated locations retrieved from master location database 158, and, in some embodiments, applies one or more conflict resolution rules if conflicting locations are retrieved from private location database 142 and master location database 158.

While the location database interface engine 152 is included in location provider system 110 in example system 100, in other embodiments at least a portion of the location database interface engine 152 is instead included in mobile device 112. In one alternative embodiment (e.g., an embodiment in which private location database 142 is included in mobile device 112 or a third party server), for example, location provider system 110 includes a first portion of location database interface engine 152 configured to retrieve estimated locations from master location database 158, and mobile device 112 includes a second portion of location database interface engine 152 configured to retrieve estimated locations from private location database 142. In this latter embodiment, the merging engine 156 portion of location database interface engine 152 may be included in mobile device 112, and the sharing engine 154 may be omitted from the example system 100. Generally, the sharing engine 154 may be omitted in embodiments in which private location database 142 cannot be shared with non-owners, and the merging engine 156 may be omitted in embodiments in which private location database 142 and master location database 156 cannot both be accessed in response to a single location query from a mobile device.

While various engines shown in FIG. 1 are described herein as being executed by one or more processors, the same processor(s) are used to execute the instructions of two or more of the engines, in some embodiments. As an example, the AP locating engine 150 and the location database interface engine 152 may both be executed by a single set of one or more processors.

FIG. 1 also illustrates an example scenario in which mobile device 112 is used to collect information for creating or updating the private location database 142 as the user moves to various locations 160 and mobile device 112 sends data 162 to location provider system 110. To facilitate the data collection process, the private location database engine 134 causes user interface 132 to provide a GUI to a user of mobile device 112. For example, user interface 132 may provide a GUI that displays a map of a geographic area in which mobile device 112 is currently located. The map may be generated based on information received from a map server 164 (e.g., in response to a query received by the map server 164 from mobile device 112), for example. The map server 164 may be included in a third party server as shown in FIG. 1, or may be included in location provider system 110, and may utilize location information received from mobile device 112 and/or from location provider system 110 to generate information to be sent to mobile device 112. In addition to a map or other display, the GUI provided by user interface 132 may provide the user of mobile device 112 with instructions on how to collect information to create and/or update the private location database 142.

As a part of the collection process, a user bearing mobile device 112 may move through an area that is generally within range of one or more transmitting devices, and select or indicate various locations corresponding to current locations of the user at different points in time. For example, in one embodiment where the mobile device 112 displays a map on a touchscreen, the user may indicate locations by touching particular areas on the touchscreen. In the scenario illustrated in FIG. 1, the user moves along a path that includes a first location 160A, a second location 160B, and a third location 160C.

At location 160A, the user indicates a first location on the displayed map (IND_LOC_A), which is generally a location on the map that the user believes corresponds to the actual location 160A. In an embodiment, private location database engine 134 causes mobile device 112 to observe signals from nearby APs in response to the user's indication of a location, and generates location-specific data corresponding to the observed signals. In the scenario of FIG. 1, mobile device 112 receives and detects signals from AP 120A and AP 120B while at location 160A, but is unable to detect signals from AP 120C. Each of the signals received from AP 120A and AP 120B includes an identifier of the AP that sent the signal (BSSID1 and BSSID2, respectively), and mobile device 112 generates a received signal strength indicator (RSSI) for each received signal (RSSI1_A and RSSI2_A, respectively). The RSSIs may be generated using a power detector and analog-to-digital convertor in network interface 130, for example. Each received BSSID and each generated RSSI is then passed to private location database engine 134, along with the first indicated location IND_LOC_A. After receiving the first indicated location and the set of associated BSSIDs and RSSIs, the private location database engine 134 generates location-specific data 162A and causes the location-specific data 162A to be transmitted to location provider system 110 via communication network 114.

The user then moves to location 160B and indicates a second location on the displayed map (IND_LOC_B), which is generally a location that the user believes corresponds to the actual location 160B. In an embodiment, private location database engine 134 again causes mobile device 112 to observe signals from nearby APs in response to the user's indication of a location, and again generates location-specific data corresponding to a set of one or more observed signals. In the scenario of FIG. 1, mobile device 112 receives and detects signals from AP 120A, AP 120B, and AP120C while at location 160B. Each of the signals received from AP 120A, AP 120B, and AP 120C includes an identifier of the AP that sent the signal (BSSID1, BSSID2, and BSSID3, respectively), and mobile device 112 generates an RSSI for each received signal (RSSI1_B, RSSI2_B, and RSSI3_B, respectively). Each received BSSID and each generated RSSI is then passed to private location database engine 134, along with the second indicated location IND_LOC_B. After receiving the second indicated location and the set of associated BSSIDs and RSSIs, the private location database engine 134 generates location-specific data 162B and causes the location-specific data 162B to be transmitted to location provider system 110 via communication network 114.

Next, the user then moves to location 160C and selects a third location on the displayed map (IND_LOC_C), which is generally a location that the user believes corresponds to the actual location 160C. In an embodiment, private location database engine 134 once again causes mobile device 112 to observe signals from nearby APs in response to the user's indication of a location, and once again generates location-specific data corresponding to a set of one or more observed signals. In the scenario of FIG. 1, mobile device 112 receives and detects signals from AP 120B and AP120C while at location 160C, but is unable to detect signals from AP 120A. Each of the signals received from AP 120B and AP 120C includes an identifier of the AP that sent the signal (BSSID2 and BSSID3, respectively), and mobile device 112 generates an RSSI for each received signal (RSSI2_C and RSSI3_C, respectively). Each received BSSID and each generated RSSI is then passed to private location database engine 134, along with the third indicated location IND_LOC_C. After receiving the third indicated location and the set of associated BSSIDs and RSSIs, the private location database engine 134 generates location-specific data 162C and causes the location-specific data 162C to be transmitted to location provider system 110 via communication network 114.

Location provider system 110 receives the location-specific data 162 and passes the data 162 to the AP locating engine 150. After receiving the location-specific data 162, the AP locating engine 150 determines an estimated location of one or more of the APs 120 based on the location-specific data. For example, AP locating engine 150 may determine estimated locations of AP 120A, AP 120B, and AP 120C using the measured RSSIs (RSSI1_A, RSSI2_A, RSSI1_B, RSSI2_B, RSSI3_B, RSSI2_C, and RSSI3_C) and the indicated locations (IND_LOC_A, IND_LOC_B, and IND_LOC_C) of location-specific data 162. The AP locating engine 150 may use any of various suitable locating techniques, such as triangulation, trilateration, etc. Once estimated locations of some or all of APs 120 are determined, the AP locating engine 150 causes the estimated locations to be stored in private location database 142 along with an identifier of each AP 120 (e.g., the respective BSSIDs of APs 120). The private location database 142 may include a relational database that indexes each estimated location to a BSSID of the corresponding AP 120, for example. In scenarios in which private location database 142 does not yet include any AP location data, AP locating engine 150 may create a set of AP location records. In scenarios in which private location database 142 does already exist, AP locating engine 150 may update the private location database 142 by replacing old estimated locations with new estimated locations. As discussed above, the private location database 142 does not necessarily store AP locations. For example, locating engine 150 may instead determine a model based on the received BSSIDs and RSSIs, and store the model data in private location database 142 for later use by mobile devices that self-locate using a WiFi "fingerprint" technique.

In various alternative embodiments, the system 100 may operate differently than described in the scenario above. For example, in one embodiment, mobile device 112 waits until all location-specific data 162 (i.e., 162A, 162B, and 162C) has been generated before transmitting the composite data 162 to location provider system 110. For example, the private location database engine 134 may wait until user interface 132 detects a particular manual input from the user (e.g., a "DONE" button on a GUI) before transmitting any location-specific data 162.

As another example, private location database engine 134 may not wait for a user indication of a location to generate signal metrics (e.g., RSSI) corresponding to the indicated location. For example, private location database engine 134 may continuously or periodically generate signal metrics for received signals from APs 120, and then utilize only the signal metrics that correspond to signals received at times (or near times) when the user indicated a location.

As yet another example, the private location database engine 134 may receive (e.g., from network interface 130) more than one signal metric corresponding to each AP signal. For example, network interface 130 may provide private location database engine 134 with a peak RSSI and an average RSSI for each AP signal. As another example, network interface 130 may provide private location database engine 134 with multiple RSSIs for an AP signal, with each RSSI being measured at a different time. In these embodiments, data representing each of the multiple signal metrics may be included in the location-specific data 162.

As still another example, and in an alternative embodiment in which an AP locating engine similar to AP locating engine 150 is included in mobile device 112, the private location database engine 134 may cause the location-specific data 162 to be sent directly to the AP locating engine within mobile device 112, rather than causing the network interface 130 to transmit the data 162 to location provider system 110. The AP locating engine within mobile device 112 then determines the estimated locations of the APs 120, and causes the estimated locations to either be transmitted to location provider 110 for storage in private location database 142, be transmitted to a third party server coupled to private location database 142, or be stored in private location database 142 within a memory included in mobile device 112, according to various embodiments.

Moreover, while the example scenario of FIG. 1 shows AP signals being observed (and location-specific data being generated) at three different locations 160A, 160B, and 160C, other scenarios may involve more or fewer than three locations. In a scenario where AP signals are observed (and location-specific data is generated) at only a single location, for example, the user bearing mobile device 112 may not move at all to collect data for the private location database 142. Moreover, in some embodiments, the user may optionally stay at a single location and repeatedly indicate a single location (e.g., on a displayed map) while observing AP signals at different times, in order to increase the accuracy of the signal metrics generated by mobile device 112.

In another alternative embodiment not shown in FIG. 1, a non-mobile device (e.g., a desktop computer, a non-mobile embedded system, etc.) is used to collect data for the private location database 142, rather than mobile device 112. Moreover, location-specific data such as location-specific data 162A, 162B, or 162C may be sent to location provider system 110 via a network that does not include a wireless component. For example, in one embodiment, a desktop computer with a WiFi card may receive signals from one or more of the APs 120 (e.g., signals including BSSIDs of the APs 120), generate any corresponding signal metrics (e.g., RSSIs), and send the location-specific data (e.g., similar to location-specific data 162) to the location provider system 110 via a wired Internet link. In such an embodiment, the data 162A, 162B, and 162C may represent data collected at three different times at the same, fixed location of the desktop, for example. Alternatively, only one set of data (e.g., the data 162A) may be sent to location provider system 110.

In another alternative embodiment not shown in FIG. 1, the private location database engine 134 may be configured to allow a user to directly enter AP locations (e.g., on a displayed map of a GUI). In this embodiment, no signal metrics need be generated, and the location-specific data 162 may include only identifiers (e.g., BSSIDs) and indicated locations of each of APs 120. In this embodiment, AP locating engine 150 may be omitted. In still other embodiments, the AP locations may be entered via a web interface (e.g., a web page stored in a memory of location provider system 110, or within private location database 142) using mobile device 112 or any other (mobile or non-mobile) computing device with an Internet connection. In these embodiments, an individual who is aware of the current locations of a set of APs may simply access a map of the relevant area (e.g., from map server 164) and enter the AP locations by tapping a touchscreen (or moving a cursor to each location on the map and clicking a mouse, etc.), for example. In yet another alternative embodiment not shown in FIG. 1, the location-specific data 162 is provided to location provider system 110 via any one or more of APs 120. For example, in one scenario, data 162A may be provided to location provider system 110 via AP 120A, data 162B may be provided to location provider system 110 via AP 120B, and data 162C may be provided to location provider system 110 via AP 120C. In this embodiment, mobile device 112 need not be configured to communicate with location provider 110 via communication network 114 (e.g., mobile device 112 need not have cellular communication capabilities).

Figure 2:
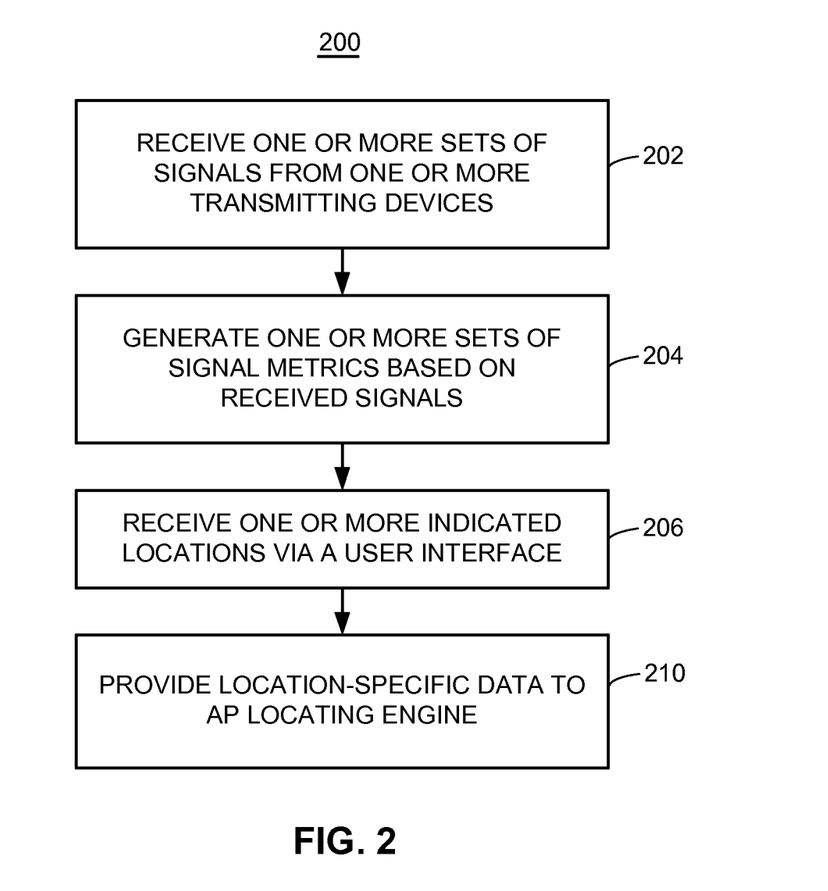
FIG. 2 is a flow diagram of an example method for collecting information for a private location database that may be implemented in the mobile device in the example system of FIG. 1.

FIG. 2 is a flow diagram of an example method 200 for collecting information for a private location database, such as the private location database 142 of FIG. 1, that is implemented in a mobile device, such as the mobile device 112 of FIG. 1.

At block 202, one or more sets of signals are received from one or more APs. The signals may be received by a network interface of the mobile device implementing the method 200, such as the network interface 130 in mobile device 112 of FIG. 1, for example. The APs from which the signals are received may be similar to the APs 120 of FIG. 1, for example. Each set of the one or more sets of signals may correspond to a different one of the one or more APs, for example.

Each set of the one or more sets of signals may include only one signal, or may include multiple signals (e.g., with each signal of the multiple signals being received at a different time). In an embodiment, each set of signals received at block 202 includes a signal identifier corresponding to the AP that sent the set of signals. For example, each signal may include a BSSID corresponding to the AP that transmitted the signal.

At block 204, one or more sets of signal metrics are generated based on the one or more sets of signals received at block 202. In an embodiment, at least one signal metric in each of the one or more sets of signal metrics is an RSSI corresponding to one of the signals received at block 202. Each set of signal metrics may include only one signal metric, or may include multiple signal metrics. For example, in an embodiment in which each set of signals received at block 202 includes two or more signals, each set of signal metrics may include a peak RSSI and an average RSSI, two or more RSSIs corresponding to the two or more received signals, etc. In some embodiments, at least one signal metric in each set of signal metrics is generated by a network interface of the mobile device, such as the network interface 130 in mobile device 112 of FIG. 1, for example. In other embodiments, at least one signal metric in each set of signal metrics is generated by an engine in the mobile device (e.g., the private location database engine 134 of FIG. 1) that receives signal information from a network interface of the mobile device. For example, a network interface of the mobile device may detect a power level of each received signal and provide corresponding digital signals to one or more processors of the mobile device, and the processor(s) may then process the digital signals to generate RSSIs in a suitable format.

At block 206, one or more indicated locations are received via a user interface of the mobile device. In an embodiment, the indicated locations are received as data representing manual selections entered by a user of the mobile device. For example, the indicated locations may correspond to user selections of one or more locations on a map displayed to the user via the user interface. In an embodiment, each received indicated location corresponds to one of the sets of signals received at block 202, and/or corresponds to one of the sets of signal metrics generated at block 204. In an embodiment, the one or more indicated locations are received by an engine in the mobile device (e.g., the private location database engine 134 of FIG. 1).

At block 210, location-specific data is provided to an AP locating engine in order to determine estimated locations of the APs that sent the signals received at block 202. The AP locating engine may be similar to the AP locating engine 150 of FIG. 1, for example. In an embodiment, an engine in the mobile device (e.g., the private location database engine 134 of FIG. 1) provides the location-specific data to the AP locating engine. The location-specific data includes data representing the one or more set of signal metrics generated at block 204, and data representing the one or more indicated locations received at block 206. In embodiments where the signal metrics are generated at block 204 in a suitable data format, and/or the indicated locations are received at block 206 in a suitable data format, the location-specific data may simply reproduce the generated signal metric data and/or the received indicated location data. In other embodiments, the mobile device converts the signal metrics and the indicated locations to a suitable format when generating the location-specific data.

In an embodiment, the location-specific data associates each indicated location received at block 206 with a corresponding set of signal metrics generated at block 204. For example, the location-specific data may be arranged by the mobile device in a format that is recognized (e.g., by a location provider system, and/or by other engines or modules within the mobile device) as associating each indicated location with the respective set of signal metrics.

In embodiments where the AP locating engine is included in a location provider system or third party server remote from the mobile device, providing the location-specific data to the AP locating engine may include transmitting the location-specific data to the location provider system or a third party server via one or more networks (e.g., a cellular network and/or wired or wireless Ethernet), and/or sending a command or request that causes a device to transmit the location-specific data. In embodiments where the AP locating engine is instead included in the mobile device, providing the location-specific data to the AP locating engine may include sending the location-specific data to the AP locating engine within the mobile device.

While the method 200 is described with reference to AP locations, other embodiments instead apply to other transmitting devices (e.g., other fixed or semi-fixed transmitting devices). Moreover, the method 200 may include additional blocks not shown in FIG. 2. For example, the method 200 may include an additional block in which indications of one or more sharing criteria are received via the user interface of the mobile device. The sharing criteria may then be applied (e.g., by the mobile device, by a location provider system, etc.) when determining whether the estimated locations are to be made available to other devices, for example. Sharing criteria are described in more detail below according to various embodiments.

Further, the blocks shown in method 200 in FIG. 2 may occur in a different order than shown. For example, in one embodiment, block 206 occurs before block 202, between block 202 and 204, or generally in parallel with either or both of block 202 and 204. As another example, block 210 may be performed generally in parallel with blocks 202, 204, and 206 (e.g., portions of the location-specific data may be generated as each signal and indicated location pair is received and processed).

FIG. 3 is another block diagram showing the example system 100 of FIG. 1. Whereas FIG. 1 illustrates a scenario in which a mobile device user creates or updates the private location database 142, however, FIG. 3 illustrates a scenario in which the private location database 142 created using mobile device 112 of FIG. 1 is shared with a user of a first mobile device 212A for use in locating the device 212A. Conversely, the private location database 142 is not shared with a second mobile device 212B, which also attempts to self-locate in the scenario of FIG. 3.

Each of mobile devices 212 includes a network interface 214 (e.g., similar to network interface 130 in FIG. 1) and a user interface 216 (e.g., similar to user interface 132 in FIG. 1). Moreover, each of mobile devices 212 includes a mobile device locating engine 218. Each mobile device locating engine 218 includes software instructions that are stored on a computer-readable medium and are configured to be executed by one or more processors in the respective mobile device 212. In various other embodiments, each mobile device locating engine 218 includes hardware, firmware, or a combination of software, hardware, and/or firmware. Each mobile device locating engine 218 is generally configured to estimate a location of the respective mobile device 212 based on signals received from APs (such as APs 120) and known locations of the APs. In some embodiments and scenarios, each mobile device locating engine 218 also utilizes signals from other transmitting devices (e.g., transmitting devices within cell towers) to estimate the location of the respective mobile device 212. In still other embodiments and scenarios, each mobile device locating engine 218 may also utilize signals from hardware and/or software within the respective mobile device 212 that is configured to detect relative movement (e.g., a gyroscope, a compass, a barometer, an accelerometer, a camera with video processing to detect movement, a speaker and microphone with audio processing to detect movement, etc.).

FIG. 3 shows private location database 142 as it exists after the AP locating engine 150 has determined the estimated locations of APs 120 (e.g., after the scenario shown in FIG. 1 occurs). Thus, private location database 142 stores an estimated location and associated identifier of each AP 120 (i.e., EST_LOC1 and BSSID1 for AP 120A, EST_LOC2 and BSSID2 for AP 120B, and EST_LOC3A and BSSID 3 for AP 120C). In the scenario illustrated in FIG. 3, the master location database 158 stores AP location information and identification information for various APs not shown in FIG. 3, as well as AP location information and identification information for AP 120C. The estimated location for AP 120C stored in master location database 158 (EST_LOC3B), however, differs from the estimated location for AP 120C stored in private location database 142 (EST_LOC3A). For example, whereas EST_LOC3A is a location determined by AP locating engine 150 using location-specific data received from mobile device 112 of FIG. 1, EST_LOC3B may be a location determined by a GPS system of a mobile device not shown in FIG. 1 or FIG. 3, or a location received directly from AP 120C by location provider system 110, or a location determined in some other manner. Moreover, EST_LOC3A and EST_LOC3B may have been determined at different times. For example, EST_LOC3B may have been determined at a first time when AP 120C was at an old location and EST_LOC3A may have been determined at a second time when AP 120C was at its current location (i.e., EST_LOC3B may be obsolete or "stale" data).

The illustration of FIG. 3 may correspond to any of various scenarios. For example, mobile devices 212 may both be in a building that contains APs 120. As a more specific example, APs 120 may be hot spots that are temporarily deployed at a conference center, and private location database 142 may be a database owned and/or created by a conference organizer FIG. 3 may also correspond to a scenario in which other self-locating systems (if any) within mobile devices 212 are inoperable. For example, mobile devices 212A and/or 212B may includes GPS chips, but be unable to self-locate using GPS due to being indoors.

In the example scenario of FIG. 3, mobile device 212A obtains permission to utilize the private location database 142 by scanning and storing a quick response (QR) code 219 (QR_CODE1). In other embodiments, the private location database 142 is instead (or additionally) shared based on other criteria (e.g., social network connections, association with an organization, proximity, licensing and/or payment, etc.), as discussed in further detail below. The QR code 219 may be automatically generated by location provider system 110 in response to records being established within private location database 142 (e.g., through the process shown in FIG. 1), for example. The code 219 may be scanned using a camera application executed by mobile device 212A, for example. In one example scenario, the QR code 219 may be made available at a conference by printing the code 219 on a poster, on a pamphlet distributed to attendees, etc. The QR code 219 may also be stored in sharing database 157 (e.g., indexed to an identifier of private location database 142), for example. In an alternative embodiment, the code 219 is a different type of code (e.g., a bar code, alphanumerical code, etc.), and/or the mobile device 212A obtains the code by means other than scanning (e.g., manual entry of an alphanumerical code by a user).

After obtaining the code 219, and when attempting to self-locate, mobile device 212A observes broadcast signals sent by various APs. In the example scenario of FIG. 3, mobile device 212A receives and detects broadcast signals from each of APs 120A, 120B, and 120C (e.g., via network interface 214A), and determines an AP identifier (BSSID1, BSSID2, and BSSID3, respectively) included in each received signal. The AP identifiers may be determined by the mobile device locating engine 218A, for example. Mobile device 212A then generates (e.g., via the mobile device locating engine 218A) an AP location query 220 that includes the determined AP identifiers, and transmits the query 220 to location provider system 110 via the first communication network (e.g., a cellular network included in communication network 114). The AP location query 220 also includes the QR code 219 previously scanned (or otherwise obtained) by mobile device 212A. The query 220 may also include other information, such as an identifier of the mobile device 212A. In some embodiments, the query 220 comprises multiple queries that are sent to location provider system 110 at different times (e.g., on a rolling basis as signals from each of APs 120 are detected, etc.).

Location provider system 110 receives the AP location query 220 via communication network 114, and passes the AP identifiers included in the query 220 to location database interface engine 152. Location database interface engine 152 then determines which of the received AP identifiers correspond to AP locations stored in master location database 158. In the scenario of FIG. 3, only the received AP identifier BSSID3 corresponds to a location (i.e., EST_LOC3B) in master location database 158. Thus, location database interface engine 152 retrieves only the location EST_LOC3B from master location database 158.

In addition, sharing engine 154 determines which private location databases, if any, mobile device 212A is permitted to use. To this end, sharing engine 154 compares the QR code 219 received with query 220 to permissions information stored in sharing database 157. In one example, mobile device 212A is permitted to use private location database 142 if the code 219 matches or otherwise corresponds to a code on a permissions list stored in sharing database 157. For example, if the sharing database 157 is included in private location database 142 (i.e., is specific to only private location database 142), sharing engine 154 may simply determine whether the code 219 matches a code that is stored in sharing database 157. Alternatively, if sharing database 157 instead stores permissions data for multiple private location databases, the sharing engine 154 may determine whether the code 219 matches a code in sharing database 157 that is indexed to an identifier (e.g., a storage location) of private location database 142. In an alternative embodiment, sharing engine 154 may utilize an identifier of mobile device 212A included in the AP location query 220 (rather than a code such as code 219) to determine which private location databases may be accessed by mobile device 212A. In another alternative embodiment, the sharing engine 154 may utilize an identifier of a user of mobile device 212A (e.g., a user identifier included in the AP location query 220, or a user identifier that may be cross-referenced to information in the AP location query 220) to determine which private location databases may be accessed by mobile device 212A. Other examples of possible sharing criteria are discussed below with reference to FIG. 4.

In the scenario of FIG. 3, sharing engine 154 determines that QR code 219 is associated with private location database 142 (e.g., by virtue of being indexed to private location database 142 in sharing database 157), and that mobile device 212A is therefore permitted to use private location database 142. Thus, location database interface engine 152 retrieves locations in private location database 142 that correspond to the AP identifiers in AP location query 220 (i.e., locations EST_LOC1, EST_LOC2, and EST_LOC3A corresponding to BSSID1, BSSID2, and BSSID3, respectively). In an alternative embodiment, location database interface engine 152 first retrieves locations from private location database 142, and then determines (e.g., using sharing engine 154) whether the retrieved locations may be utilized by mobile device 212A.

Merging engine 156 within location database interface engine 152 receives locations retrieved from private location database 142 and master location database 158 and aggregates the data. In an embodiment, merging engine 156 determines whether location information retrieved from private location database 142 is consistent with location information retrieved from master location database 158, and applies one or more conflict resolution rules in situations where inconsistencies exist. For example, in the embodiment and scenario of FIG. 3, merging engine 156 detects that both private location database 142 and master location database 158 include a location corresponding to BSSID3, and applies conflict resolution rules to determine whether EST_LOC3A or EST_LOC3B will be sent to mobile device 212A in response to the query 220.

In an embodiment, applying the conflict resolution rules includes comparing priorities of location databases from which the conflicting estimated locations are received. For example, merging engine 156 may determine that private location database 142 is associated with a higher priority than master location database 158, and therefore select EST_LOC3A as a best estimated location for AP 120C rather than EST_LOC3B. In a scenario where private location database 142 is owned by a company, for example, each mobile device associated with the company (e.g., associated with a user that is employed by the company) may prefer locations from private location database 142 over locations from master location database 158. In other embodiments, more complicated conflict resolution rules or algorithms may be applied by merging engine 156. For example, private location database 142 may be preferred in a first geographic area, a second private location database (not shown in FIG. 3) may be preferred in a second geographic area, and the master location database 158 may be preferred in geographic areas outside the first and second geographic areas. In an embodiment, the conflict resolution rules may be dynamically adjusted based on a quality of previous estimated locations. For example, private location database 142 and/or master location database 158 may be associated with one or more quality indicators representing the accuracy of estimated locations stored in the respective databases (e.g., as determined by feedback from users, by cross-referencing with location information collected by other means, etc.).

Once merging engine 156 has aggregated locations from private location database 142 and master location database 158, and (where necessary) applied conflict resolution rules to determine a best estimate of duplicate locations, location provider system 110 transmits a response 222 to mobile device 212A via communication network 114. The response 222 includes the estimated locations of each AP 120 for which mobile device 212A included a BSSID in the query 220. In scenarios where location database interface engine 152 cannot determine a storage location of an estimated location corresponding to a received BSSID, the response 222 does not include a location of the corresponding AP. In the example scenario illustrated in FIG. 3, the response includes EST_LOC1, EST_LOC2, and EST_LOC3A, corresponding to AP 120A, AP 120B, and AP 120C, respectively. In an alternative embodiment, separate responses each include one or more, but not all, of the estimated AP locations (e.g., a response is sent to mobile device 212A each time an estimated location is retrieved from private location database 142 of master location database 158, or periodically so long as at least one estimated location has been retrieved, etc.). In another alternative embodiment, the response 222 additionally includes locations of one or more APs in addition to APs 120A, 120B, and 120C. For example, location provider system 110 may decide to "pre-fetch" certain AP locations even though no indication of the additional APs was provided in query 220 (e.g., additional AP locations may be provided based on the proximity of the additional AP(s) to APs 120A, 120B, and/or 120C, etc.). In yet another alternative embodiment, in which location provider system 110 (rather than mobile device 212A) estimates the location of mobile device 212A, the response 222 includes the estimated location of the mobile device 212A instead of the estimated AP locations EST_LOC1, EST_LOC2, and EST_LOC3A.

After receiving the response 222 via the first (e.g., cellular) communication network, the mobile device locating engine 218A uses the received estimated locations of the APs 120, and signal metrics (e.g., RSSIs) that the mobile device 212A generated for signals received from the APs 120, to determine an estimated location of mobile device 212A. The mobile device locating engine 218A may use a suitable locating technique such as triangulation, for example. In an alternative embodiment, the mobile device locating engine 218A is included in location provider system 110, which estimates the location of mobile device 212A and transmits the estimated location to mobile device 212A via communication network 114.

In various alternative embodiments, the mobile device 212A gains access to private location database by other means not depicted in FIG. 3. In one alternative embodiment, where private location database 142 is not coupled to (or included in) location provider system 110 (e.g., if private location database 142 is instead coupled to a third party server not shown in FIG. 3), mobile device 212A gains access to private location database 142 by obtaining certain access information and utilizing that information to retrieve estimated AP locations from database 142. For example, mobile device 212A may receive access information that includes an address of a third party server that is coupled to the private location database 142. The access information may be information that is manually entered via a user interface of mobile device 212A, for example, or information that is downloaded from a website accessed by mobile device 212A, etc. The access information could be imported by a user of mobile device 212A by selecting options from a menu or other interface, for example.

In another alternative embodiment, mobile device 212A gains access to private location database 142 by downloading a copy of private location database 142 (e.g., from a third party server maintaining a copy of the database 142, or from an owner's mobile device that stores the database 142). In this embodiment, mobile device 212A may store private location database 142 in a standard storage location in mobile device 212A, and query both the private location database 142 and location provider system 110 each time an AP location is needed (or query location provider system 110 only when an AP location is not found in private location database 142). In this alternative embodiment, a merging engine similar to merging engine 156 may be included in mobile device 212A, and sharing engine 154 may be omitted from the system 100.

In other scenarios, the mobile device 212A is the same as mobile device 112 of FIG. 1, which was used to create and/or update the private location database 142. In this scenario (e.g., where a user of mobile device 212A is an owner of private location database 142), mobile device 212A may be able to use private location database 124 without sharing engine 154 checking any sharing criteria. Alternatively, sharing engine 154 may check permissions in the same manner regardless of whether the mobile device 212A is associated with an owner of the private location database 142, or associated with an individual with which the private location database 142 is being shared. For example, the QR code 219 may be automatically stored in mobile device 212A if mobile device 212A is used to collect data for the private location database 142. Alternatively, the user of mobile device 212A may need to scan QR code 219 just like any other mobile device user in order to use private location database 142.

Similar to mobile device 212A, mobile device 212B attempts to self-locate by 1) observing broadcast signals sent by APs over the second (e.g., WiFi) communication network, 2) determining AP identifiers included in the received signals, 3) generating an AP location query 224, and 4) causing the query 224 to be transmitted to location provider system 110 via the first communication network (e.g., a cellular network included in communication network 114). In the example scenario of FIG. 3, mobile device 212B receives and detects broadcast signals from each of APs 120A, 120B, and 120C (e.g., via network interface 214B), and determines that the received signals include the AP identifiers BSSID1, BSSID2, and BSSID3, respectively. As with the query 220, the query 224 may comprise multiple queries that are sent to location provider system 110 at different times.

Location provider system 110 receives the AP location query 224 via communication network 114, and passes the AP identifiers (BSSIDs) included in the query 224 to location database interface engine 152. Location database interface engine 152 then determines which of the received AP identifiers correspond to AP locations stored in master location database 158. As discussed above, only the received AP identifier BSSID3 corresponds to a location (i.e., EST_LOC3B) in master location database 158 in the scenario of FIG. 3. Thus, location database interface engine 152 retrieves only the location EST_LOC3B from master location database 158.

In addition, sharing engine 154 determines which private location databases, if any, mobile device 212B is permitted to use. The determination by sharing engine 154 may be similar to the determination described above in connection with query 220 from mobile device 212A, for example. In the scenario of FIG. 3, however, sharing engine 154 does not permit mobile device 212B to use private location database 142 because the user of mobile device 212B did not scan the QR code 219, and the query 224 therefore did not include QR code 219. Thus, no locations are retrieved from private location database 142 in response to query 224. In an alternative embodiment, sharing engine 154 determines that mobile device 212B is not permitted to use private location database 142 by determining that an identifier of mobile device 212B (included in query 224) is not included in sharing database 157, and/or is not indexed to private location database 142 in sharing database 157.

After retrieving the location EST_LOC3B from the master location database 158, location provider system 110 transmits a response 226 including EST_LOC3B to mobile device 212B via communication network 114. After receiving the response 226, the mobile device location engine 218B uses the received estimated location of AP 120C, and the signal metrics (e.g., RSSIs) that the mobile device 212B generated for signals received from the AP 120C, to determine an estimated location of mobile device 212B. The mobile device locating engine 218B may estimate the location of mobile device 212B using a suitable technique such as triangulation, for example. In an alternative embodiment, the mobile device locating engine 218B is included in location provider system 110, and mobile device 212B sends the signal metrics to location provider system 110 to determine the estimated location of mobile device 212B. If more than one AP location (e.g., three or more AP locations) is required to estimate a location of mobile device 212B, location provider system 110 may not send an estimated location to mobile device 212B, the mobile device locating engine 218B does not estimate a location in the scenario of FIG. 3.

In an alternative embodiment, and as discussed above in connection with FIG. 1, the private location database 142 does not include AP locations. For example, if mobile devices 212A and 212B use WiFi "fingerprint" locating techniques, master location database 158 and private location database 142 may include model data or other content that may be utilized to locate a mobile device based on detected AP (or other transmitting device) fingerprints. In some of these embodiments, the replies 222 and 226 may include data other than AP locations (e.g., the location provider system 110 may directly provide an estimated location of the mobile device 212A or 212B in the reply 222 or 226 based on a comparison of the detected fingerprint with model data in the private location database 142). Moreover, in some of these embodiments, the merging engine 156 may simply decide whether to send data from the master location database 158 or the private location database 142, without performing any conflict resolution algorithms.

In some embodiments, the system 100 includes more than one private location database similar to private location database 142. The multiple private location databases may be coupled to (or included in) location provider system 110, be coupled to one or more third party servers, stored in various mobile devices, or some combination of the above. In one embodiment, a database (e.g., stored in location provider system 110, or coupled to a third party server, etc.) maintains an index that includes multiple private location database identifiers and various information corresponding to the private location databases (e.g., database owner contact information, a description of geographic area covered by the private location database, etc.). The index may be generally available to the public via a website, for example, to allow others to contact owners or agents to license or otherwise negotiate access to any of the private location databases.

In some embodiments, multiple private location databases are owned by respective individuals, and may be shared with others in a peer-to-peer type of system. For example, a first person may own a first private location database similar to private location database 142 and a second person may own a different, second private location database similar to private location database 142. Each private location database may include only estimated locations that were determined based on location information collected using the respective owner's mobile device (and/or location information collected using a mobile device of a member of an organization to which the owner belongs, or with which the owner is otherwise associated), for example. In these embodiments, each owner (and/or members of an organization associated with the owner) is able to utilize the owner's private location database when using his or her mobile device to self-locate. In addition, in some embodiments, each owner (and/or members of an organization associated with the owner) is able to utilize estimated locations in a master location database of a location provider, and/or estimated locations stored in any private location databases shared by other individuals/owners. The private location databases may be shared based on sharing criteria that are set up at some time before self-locating mobile devices attempt to access the private location databases. For example, a first private location database may automatically (or in response to an owner's selections) be shared with social network contacts (e.g., "friends") of the owner of the first private location database, and a second private location database may automatically (or in response to an owner's selections) be shared with social network contacts of the owner of the second private location database. Other example sharing criteria are discussed below with reference to FIG. 4. In some peer-to-peer type systems, each owner and/or associated organization (as opposed to a location provider) is responsible for storage/maintenance of the owner's private location database. For example, each private location database may be stored in the respective owner's mobile device, or stored in a database maintained by a third party server on behalf of the owner and/or associated organization.

Figure 4:
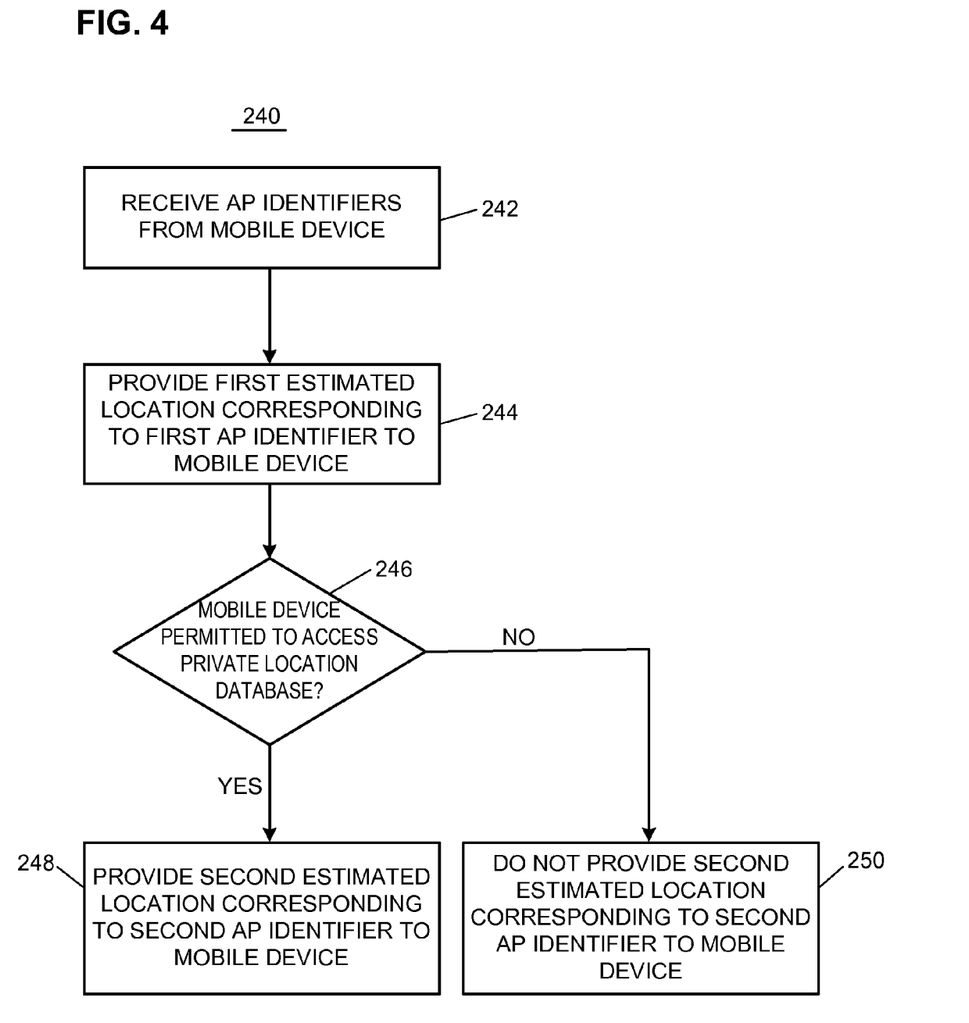
FIG. 4 is a flow diagram of an example method for locating a mobile device using multiple location databases that may be implemented in the location provider system in the example system of FIG. 3.

FIG. 4 is a flow diagram of an example method 240 for locating a mobile device using multiple location databases, such as the master location database 158 and private location database 142 of FIGS. 1 and 3. The method 240 is implemented in a location provider system, such as the location provider system 110 of FIG. 3, for example. In an embodiment, the method 240 is performed in whole or in part by an engine similar to location database interface engine 152 of FIGS. 1 and 3.

At block 242, a plurality of AP identifiers is received from a mobile device, such as the mobile device 212A or the mobile device 212B of FIG. 3. The plurality of AP identifiers includes at least a first AP identifier and a second AP identifier, and each AP identifier corresponds to a respective one of a plurality of APs from which signals were observed by the mobile device. Each AP identifier may be a BSSID, for example.

At block 244, a first estimated location is provided to the mobile device. The first estimated location corresponds to the first AP identifier received at block 242, and is retrieved from a master location database, such as the master location database 158 of FIG. 3. In an embodiment, the location provider system provides the first estimated location to the mobile device at least in part by retrieving the first estimated location from the master location database, and/or transmitting the first estimated location to the mobile device. The location provider system may retrieve the first estimated location by sending the first AP identifier to the master location database in a suitable query format, and in response receiving the first estimated location from the master location database, for example.

At block 246, it is determined whether the mobile device from which the AP identifiers are received at block 242 is permitted to utilize location information stored in a private location database, such as the private location database 142 of FIG. 3. The analysis at block 246 may involve determining whether the mobile device is associated with an owner of the private location database, and/or whether the mobile device has permission to share in use of the private location database. In some embodiments and scenarios, for example, the analysis at block 246 is made at least in part by determining whether an identifier of the mobile device is associated with the private location database (e.g., whether the mobile device identifier is indexed to the private location database in a different database, or is stored in a location of the private location database reserved for mobile devices having access to the private location database, etc.), or is associated with an owner of the private location database (e.g., whether the mobile device identifier is indexed to an owner of the private location database in an ownership database, or is stored in a location of the private location database reserved for indicating ownership of the private location database, etc.).

In other embodiments and scenarios (e.g., where the mobile device is not associated with ownership of the private location database), the determination at block 246 is made at least in part by determining whether one or more sharing criteria are satisfied. In one embodiment, the mobile device is permitted to utilize the location information stored in the private location database if the mobile device is associated with a particular social network. For example, an owner of the private location database may have indicated (e.g., by using an application running on a different mobile device, and/or by interfacing with a web page) that the private location database can be shared with certain particular members of a particular social network (e.g., a user's friends). The analysis at block 246 may then include determining whether a location query from the mobile device (e.g., similar to location query 220 or location query 224 in FIG. 3) includes an indicator of whether the mobile device is associated with a user who is a member of the indicated social network.

In another embodiment, the mobile device is permitted to utilize the location information stored in the private location database if the mobile device is associated with a particular organization. For example, an owner of the private location database may have indicated (e.g., by using an application running on a different mobile device, and/or by interfacing with a web page) that the private location database can be shared with employees of a particular company. The analysis at block 246 may then include determining whether a location query from the mobile device (e.g., similar to location query 220 or location query 224 in FIG. 3) includes an indicator of whether the mobile device is associated with a user who is associated with (e.g., employed by) the indicated company.

More generally, the mobile device may be permitted to utilize the location information stored in the private location database if the mobile device is associated with a particular identifier, or with one of a particular group of identifiers. The identifier may indicate association with a social network or organization (as described above), or may indicate association with a person or entity designated by an owner of the private location database in some other manner, for example. Mobile device identifiers corresponding to mobile devices with which the private location database can be shared may be included in a permissions list (e.g., a permissions list stored in a database such as sharing database 157 of FIGS. 1 and 3), for example.

In another embodiment, the mobile device is permitted to utilize the location information stored in the private location database if the mobile device is associated with a particular code. For example, the mobile device may be permitted to utilize the location information in the private location database if the mobile device stores the code and includes the code (or data corresponding to the code) in a location query such as location query 220 of FIG. 3. A user may obtain the code for his or her mobile device in various ways. For example, the user may scan the code (e.g., a QR or bar code), or enter a numerical or alphanumerical code, that is printed on a poster, slide, pamphlet, etc., at a particular location or event (e.g., at a conference). After obtaining and storing the scanned (or otherwise entered) code, the mobile device may include the code (e.g., a data representation of the code) in a location query similar to the location query 220 in FIG. 3, for example.

In another embodiment, the mobile device is permitted to utilize the location information stored in the private location database if a time (e.g., the current time) is within a particular time range. For example, an owner of the private location database may have indicated (e.g., by using an application running on a different mobile device, and/or by interfacing with a web page) that the private location database can be shared with other mobile devices only during certain days, weeks, etc. (e.g., while a particular conference is in progress).

In another embodiment, the mobile device is permitted to utilize the location information stored in the private location database if a user associated with the mobile device has indicated acceptance of an agreement with respect to the private location database. For example, an owner of the private location database may have indicated (e.g., by using an application running on a different mobile device, and/or by interfacing with a web page) that the private location database can be shared with other mobile devices associated with users who have indicated acceptance of a licensing agreement (or with users who have made a licensing payment, etc.). Alternatively, the private location database may be shared only in response to an indication that a payment (e.g., licensing payment) has been made.

In another embodiment, the mobile device is permitted to utilize the location information stored in the private location database based on proximity to another device, such as an owner's mobile device. For example, an owner's mobile device may be configured to detect another mobile device in contact with (or within a particular range of) the owner's device, and automatically (or in response to manual inputs from the owner and/or the user of the other mobile device) transmit access data (e.g., a code) to the other mobile device, where the access data provides access to the private location database. A technology such as Android Beam may be used to transmit the access data, for example.

Generally, beyond the above examples, any suitable sharing criteria may be used. The sharing criteria may require action (e.g., inputs via a user interface of a mobile device) by the user of the mobile device desiring access to the private location database (e.g., scanning a QR code), or may occur automatically (e.g., based on a current time, a user's proximity to an owner's mobile device or a certain geographic area, etc.). In some embodiments, various options are initially selected by the mobile device user (e.g., opting in to an arrangement wherein private location databases may be mutually shared, selecting the type of private location databases that are desired based on confidence/popularity level or other criteria, etc.), but the determination of whether the mobile device may access a private location database occurs automatically without requiring further action by the user.

In some embodiments, two or more of the sharing criteria described above, and/or other sharing criteria, are applied at block 246. The sharing criteria may be conjunctive (e.g., all sharing criteria must be met for sharing), disjunctive (e.g., only one criteria need be met for sharing), or some combination of both. The analysis at block 246 may be performed by a sharing engine such as the sharing engine 154 of FIGS. 1 and 3, for example. In one embodiment, sharing criteria are only applied if it is first determined at block 246 that the mobile device is not associated with the private location database (and/or not associated with an owner of the private location database).

If it is determined at block 246 that the mobile device is permitted to access the private location database, flow proceeds to block 248. At block 248, a second estimated location is provided to the mobile device. The second estimated location corresponds to the second AP identifier received at block 242, and is retrieved from the private location database. In an embodiment, the location provider system provides the second estimated location to the mobile device at least in part by retrieving the second estimated location from the private location database, and/or transmitting the second estimated location to the mobile device. The location provider system may retrieve the second estimated location by sending the second AP identifier to the private location database in a suitable query format, and in response receiving the second estimated location from the private location database, for example. In an alternative embodiment, the second estimated location is retrieved from the private location database at an earlier time prior to blocks 246 and 248, and block 248 includes transmitting the second estimated location to the mobile device.

If it is determined at block 246 that the mobile device is not permitted to access the private location database, flow proceeds to block 250. At block 250, the second estimated location corresponding to the second AP identifier is not provided to the mobile device. In an embodiment, a flag or data field is set at block 250 to indicate that no estimated locations may be retrieved from the private location database in response to queries from the mobile device.

While the method 240 corresponds to a scenario in which two AP identifiers are received and two estimated locations are provided, a device or system capable of implementing the method 240 may in other scenarios receive only a single AP identifier and provide only a single estimated location, or receive more than two AP identifiers and provide more than two estimated locations.

In some embodiments, the method 240 includes additional blocks not shown in FIG. 4. For example, in one embodiment and scenario in which both the master location database and the private location database include a location corresponding to the same AP identifier, the method 240 also includes determining a best choice between the two estimated locations. The best choice may be determined by applying one or more conflict resolution rules, for example. In an embodiment, applying the conflict resolution rule(s) includes comparing priorities associated with the master location database and private location database. For example, an estimated location that corresponds to a particular AP identifier and is stored in the private location database may be preferred over an estimated location that corresponds to the same AP identifier but is stored instead in the master location database.

In an embodiment, one or more of the conflict resolution rules is dynamically adjustable based on a quality of estimated locations previously determined by the master location database and/or private location database. For example, a priority of the private location database may become higher as the location provider system determines and/or receives information indicating that the private location database has provided high-quality location estimates. The quality determination may be made based on any suitable information, such as feedback from users, automatic comparisons of estimated locations in a location database with other estimated locations known to be highly accurate, etc., according to various embodiments.

In another embodiment, the method 240 includes an additional block in which it is determined whether the mobile device is permitted to utilize location information stored in a second, different private location database. If it is determined that the mobile device is permitted to utilize location information stored in the second private location database, flow proceeds to another additional block of method 240 in which a third estimated location stored in the second private location database is provided to the mobile device. In this embodiment, the third estimated location corresponds to a third AP identifier of the plurality of AP identifiers received at block 242. The second private location database may be similar to the private location database 142 of FIGS. 1 and 3, for example.

In some embodiments, the method 240 is applied to transmitting devices other than APs. Moreover, the blocks shown in method 240 in FIG. 4 may occur in a different order than shown. For example, in one embodiment, blocks 246 and 248 or 250 may occur before block 244, or generally in parallel with block 244. As another example, block 242 may be performed generally in parallel with blocks 244, 246, 248, and/or 250 (e.g., estimated locations may be provided to the mobile device piecemeal as AP identifiers are received from the mobile device).

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," or "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating, updating, and/or utilizing a private location database through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system for creating and sharing a private location database, the system comprising:
   a first mobile device associated with a first user, wherein the first mobile device is configured to:
      collect location-specific data corresponding to one or more transmitting devices, and
      cause a private location database storing location information indicative of locations of the one or more transmitting devices to be generated based on the collected location-specific data;
   a sharing database storing permissions data specific to the private location database, wherein the permissions data associates the private location database with either a second user or a second group of which the second user is a member;

a second mobile device associated with the second user, wherein the second mobile device is configured to:

cause a location of the second mobile device to be determined utilizing the private location database, wherein the private location database is utilized in response to the association in the permissions data of the private location database with the second user or the second group; and a location provider system configured to:

receive a plurality of identifiers from the second mobile device, wherein each identifier corresponds to a respective one of a plurality of transmitting devices, and wherein the plurality of identifiers includes at least a first identifier and a second identifier, retrieve a first estimated location from a master location database, wherein the first estimated location corresponds to the first identifier, determine whether location information stored in the private location database may be shared with the second mobile device, in response to a determination that the location information stored in the private location database may be shared with the second mobile device, cause a second estimated location to be retrieved from the private location database, wherein the second estimated location corresponds to the second identifier, and cause a location of the second mobile device to be determined based on at least the first estimated location and the second estimated location.

2. The system of claim 1, wherein the location-specific data includes at least one selected from the group consisting of (i) manually entered indications of locations of the one or more transmitting devices, (ii) manually entered indications of locations of the first mobile device, and (iii) signal metrics corresponding to wireless signals received from the one or more transmitting devices.

3. The system of claim 1, wherein the second mobile device is configured to cause the location of the second mobile device to be determined utilizing the private location database at least in part by sending a location query to a server of the location provider system.

4. The system of claim 1, wherein:

a third estimated location in the master location database and a fourth estimated location in the private location database both correspond to a third identifier of the plurality of identifiers, the location provider system is further configured to determine a best estimated location corresponding to the third identifier by applying one or more conflict resolution rules, and the best estimated location is either the third estimated location or the fourth estimated location.

5. The system of claim 4, wherein applying the one or more conflict resolution rules includes comparing a first priority associated with the master location database to a second priority associated with the private location database.

6. A method in a mobile device, the method comprising:

obtaining, at the mobile device, a private location database indicator, wherein the private location database indicator corresponds to a private location database storing transmitting device locations, and wherein obtaining a private location database indicator includes (i) scanning a code corresponding to the private location database or (ii) receiving a manually entered code corresponding to the private location database;

receiving, at the mobile device, one or more signals from one or more transmitting devices, wherein the one or more signals include one or more identifiers corresponding to the one or more transmitting devices;

generating one or more signal metrics based on the one or more received signals;

gaining access to the private location database using the private location database indicator; and determining a location of the mobile device using location information stored in the private location database and the generated one or more signal metrics.

7. The method of claim 6, wherein obtaining the private location database indicator includes scanning a QR code corresponding to the private location database or a bar code corresponding to the private location database.

8. The method of claim 6, wherein obtaining the private location database indicator includes receiving a manually entered code via a user interface of the mobile device.

9. The method of claim 6, wherein gaining access to the private location database using the private location database indicator includes transmitting the private location database indicator to a server of a location provider system.

* * * * *